United States Patent
Kaufman et al.

(10) Patent No.: US 11,314,781 B2
(45) Date of Patent: Apr. 26, 2022

(54) CONSTRUCTION OF REFERENCE DATABASE ACCURATELY REPRESENTING COMPLETE SET OF DATA ITEMS FOR FASTER AND TRACTABLE CLASSIFICATION USAGE

(71) Applicants: International Business Machines Corporation, Armonk, NY (US); Mars, Inc., McLean, VA (US)

(72) Inventors: James H. Kaufman, Armonk, NY (US); Matthew A. Davis, Armonk, NY (US); Bart C. Weimer, Davis, CA (US)

(73) Assignee: International Business Machines Corporation, Armonk, NY (US)

( * ) Notice: Subject to any disclaimer, the term of this patent is extended or adjusted under 35 U.S.C. 154(b) by 530 days.

(21) Appl. No.: 16/146,576

(22) Filed: Sep. 28, 2018

(65) Prior Publication Data

US 2020/0104406 A1    Apr. 2, 2020

(51) Int. Cl.
*G06F 16/28* (2019.01)

(52) U.S. Cl.
CPC .................. *G06F 16/285* (2019.01)

(58) Field of Classification Search
CPC .................................................... G06F 16/285
See application file for complete search history.

(56) References Cited

U.S. PATENT DOCUMENTS

| 7,058,650 | B2 | 6/2006 | Yang et al. | |
| 2014/0330826 | A1* | 11/2014 | Hu | G06F 16/285 707/737 |
| 2015/0234980 | A1 | 8/2015 | Lee | |
| 2015/0294065 | A1 | 10/2015 | Gautier et al. | |
| 2018/0203976 | A1* | 7/2018 | Chiu | G16B 30/00 |
| 2020/0034490 | A1* | 1/2020 | Skodinis | G06F 16/355 |

FOREIGN PATENT DOCUMENTS

CN          103093123         5/2013

OTHER PUBLICATIONS

M. Nei, "Genetic Distance Between Populations", The American Naturalist 106, 949. 283-292 (1972).

(Continued)

*Primary Examiner* — William B Partridge
*Assistant Examiner* — Lahcen Ennaji
(74) *Attorney, Agent, or Firm* — L. Jeffrey Kelly

(57) ABSTRACT

For each unique pair of a complete set of data items, a computing device determines a distance between the data items of the unique pair. The computing device repeats the following until no data items remain in the complete set. For each data item remaining in the complete set, the computing device determines a similarity subset including each other data item that the distance between the data item and the other data item is less than a target difference threshold. The computing device moves a selected data item from a largest similarity subset to a reference database that is a subset of the complete set. The computing device removes each data item from the complete set that the distance between the selected data item and the data item is less than the threshold. A new data item can be classified using the reference database.

21 Claims, 3 Drawing Sheets

(56) References Cited

OTHER PUBLICATIONS

J. H. Ward Jr, "Hierarchical Grouping to Optimize an Objective Function", Journal of the American statistical association 58, 301. 236-244 (1963).

Han, N., Qiang, Y., & Zhang, W. (2016). ANItools web: a web tool for fast genome comparison within multiple bacterial strains. Database, 2016, baw084.

Xiang, Z., Tian, Y., & He, Y. (2007). PHIDIAS: a pathogen-host interaction data integration and analysis system. Genome biology, 8(7), R150.

McNeil, L.K., Reich, C., Aziz, R. K. et al. (2007). The National Microbial Pathogen Database Resource (NMPDR): a genomics platform based on subsystem annotation. Nucleic acids research, 35(suppl 1), D347-D353.

B. D. Ondov, T. J. Treangen, P. Melsted, A. B. Mallonee, N. H. Bergman, S. Koren, and A. M. Phillippy, MASH: fast genome and metagenome distance estimation using MinHash, Genome Biology 17, 132 (2016).

J. P. Meier-Kolthoff, A. F. Auch, H.-P. Klenk, and M. Göker, Genome sequence-based species delimitation with confidence intervals and improved distance functions, BMC bioinformatics 14, 1(2013).

D. Mullner, Modern hierarchical, agglomerative clustering algorithms, arXiv preprint arXiv:1109.2378 (2011).

R. C. Edgar, MUSCLE: multiple sequence alignment with high accuracy and high throughput, Nucleic acids research 32, 1792 (2004).

R. C. Edgar, MUSCLE: a multiple sequence alignment method with reduced time and space complexity, BMC bioinformatics 5, 113 (2004).

\* cited by examiner

CONSTRUCTION OF REFERENCE DATABASE ACCURATELY REPRESENTING COMPLETE SET OF DATA ITEMS FOR FASTER AND TRACTABLE CLASSIFICATION USAGE

BACKGROUND

Data classification is an approach by which a new data item is classified by comparing the new data item existing data items having known classifications. Classification as a technique can thus be employed to determine whether a data item similar to any existing data item of a reference database is present within a new sample of one or more data items. Similarly, classification can be used to determine whether a data item similar to any existing data item of the reference database is absent from the new sample.

SUMMARY

An example method includes receiving, by a computing device, a complete set of data items. The method includes, for each unique pair of the data items, determining, by the computing device, a difference between a first data item of the unique pair and a second data item of the unique pair. The method includes repeating the following. For each data item remaining in the complete set, the computing device determines a similarity subset including each other data item that the difference between the data item and the other data item is less than a target difference threshold. The computing device moves a selected data item from a largest similarity subset to a reference database that is a subset of the complete set of data items. The computing device removes each data item from the complete set that the difference between the selected data item and the data item is less than the target difference threshold. The foregoing is repeated until no data items remain in the complete set.

An example system includes a storage device storing a reference database that is a subset of a complete set of data items. Each data item of the complete set has a distance to a data item of the subset that is less a target difference threshold. The system includes logic implemented at least in hardware to classify a new data item using the reference database.

An example non-transitory computer-readable data storage medium stores program code executable by a processor. The processor is to perform the following while a complete set of data items remains non-empty. For each data item remaining in the complete set, the processor determines a similarity subset including each other data item that a distance between the data item and the other data item is less than a target difference threshold. The processor moves a selected data item from a largest similarity subset to a reference database that represents the complete set and that is a subset of the complete set. The processor removes each data item from the complete set that the difference between the selected data item and the data item is less than the target difference threshold.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

Figure 1:
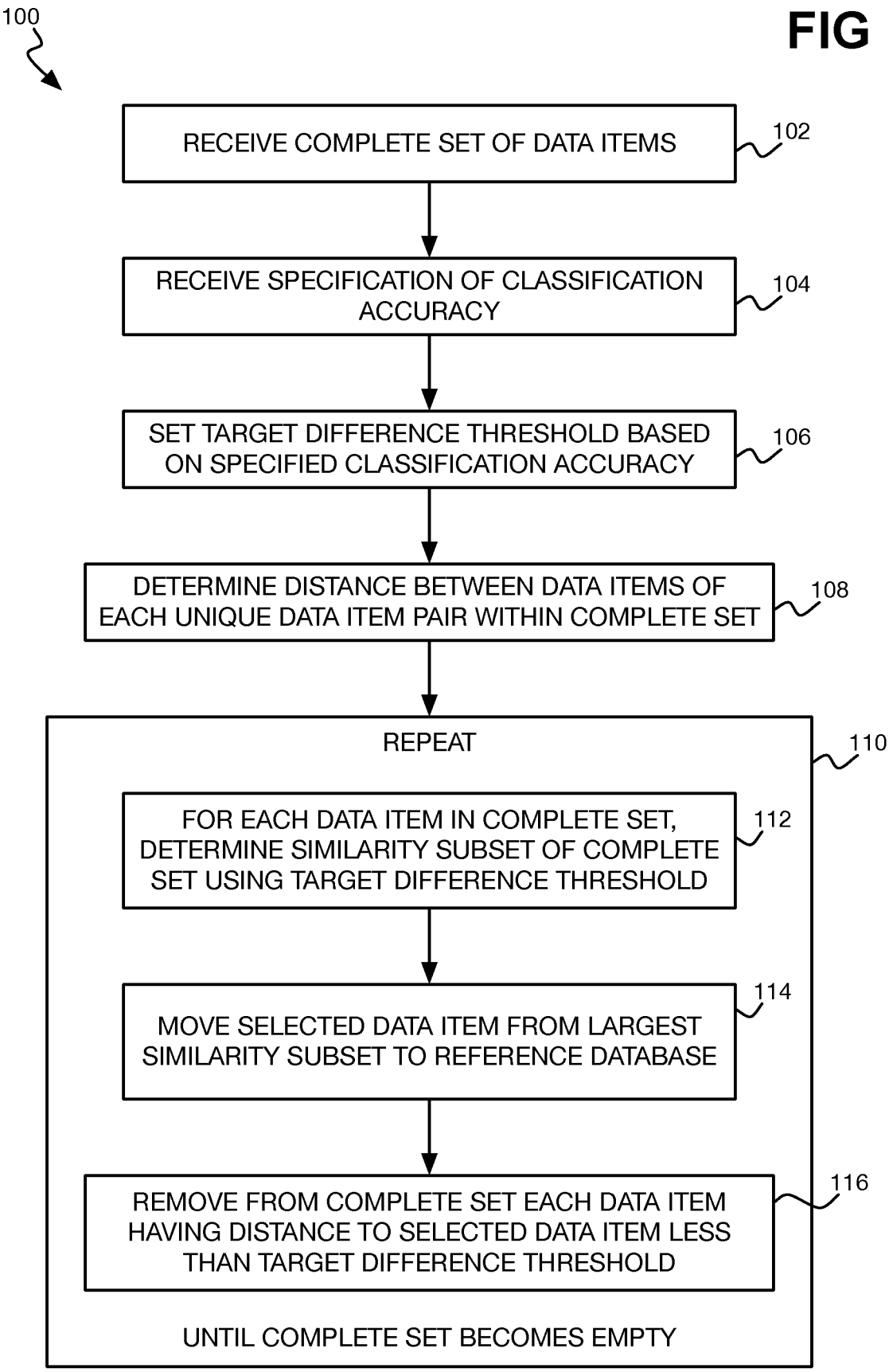
FIG. 1 is a flowchart of an example method to construct a reference database from a complete set of data items, the reference database being a subset of the complete set of data items.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, a reference database of data items that have already been classified can be used to classify a new data item, including determining whether data items similar to the data items of the reference database are present in or absent from a new sample of one or more data items. In general, the more data items that are present within a reference database, the more accurate the classification of a new data item using the database will be. However, technical issues can prevent simply including every data item that has been classified within the reference database.

First, classification techniques can place undue computational pressure on the hardware and other processing resources that perform the classification. While processing power has increased dramatically, some problem domains may still result in data items of sufficient number that performing classification of a new data item using every data item that has already been classified computationally prohibitive. That is, it may take too long to classify a new data item within a desired time frame, or indeed classification can be temporally bounded by a nearly infinite time frame, such as tens of years or even more.

Second, classification techniques may similarly place undue storage pressure on the memory resources that store the reference database while classification occurs. Some classification techniques may require that the entirety or at least a large portion of the reference database be completely stored in memory, as opposed to being offloaded to non-addressable storage resources. While memory capabilities have also improved dramatically, they are still not limitless, and some problem domains may result in data items of sufficient number that the data items cannot all be stored in memory at the same time, such that certain classification techniques may not be able to be performed.

Selecting a subset of all the available data items that have already been classified to include within a reference database against which classification techniques can be performed may therefore be desirable. However, such selection cannot be performed randomly or even according to existing statistical techniques. This is because if the resulting reference database may not accurately reflect the set of all data items, which can introduce both false positive and false negative results when subsequently performing classification using the database.

Techniques described herein construct such a reference database that accurately represents a complete set of data items for faster and tractable classification purposes. The reference database is a subset of the complete set of data items. Each data item of the complete set has a distance to a data item of the subset that is less than a target difference threshold. The distance between two data items can be the difference between the two data items in terms of the extent to which they vary from one another. The reference database may have a classification accuracy equal to the k-th power of one minus the target distance threshold, where k is an associated length of each data item.

FIG. 1 shows an example method 100 to generate a reference database that can be employed for classification and other purposes in lieu of a complete set of data items of which the reference database is a subset. The method 100 can be implemented as program code stored on a non-transitory computer-readable data storage medium. A processor of a computing device can execute the program code to perform the method 100. The reference database is initially empty when the method 100 is performed, and then is populated with data items from a complete set of data items.

The computing device receives a complete set of data items (102). The set of data items is referred to as the complete set insofar as it is a larger set of data items than will be represented in the reference database upon construction of the database. The complete set of data items may be all currently known and/or currently classified data items. Each data item has an associated length. For example, every data item may have the same length.

Each data item may be a genome having a number of substrings, such as kmers, which each have the same particular length, which is the length of the data item. More generally, each genome may have a sequence of base pairs determined via DNA sequencing, where the number of base pairs is the length of the data item. Each data item may be a protein having one or more substrings, like kmers, having the same particular length. For instance, each protein may have a sequence of amino acids determined via protein sequence, where the number of amino acids is the length of the data item. Examples of proteins and genes can include pathogens. Most generally, each data item may be a collection of phonemes, syllables, letters, or base pairs, from which n-grams of a particular length are selected.

The computing device receives a specification of the desired classification accuracy of the reference database that is to be constructed (104). The classification accuracy can be considered the probability that a new data item is classified correctly using just the reference database, and not the complete data set in its entirety. Correct classification in this respect can include properly indicating that the new data item is of a same classification as an already classified data item within the complete set, or that the new data item does not have the same classification as any already classified data item within the complete set. Stated another way, the classification accuracy can be considered the fraction of new data items correctly classified when using just the reference data, and not the complete data set in its entirety. The classification accuracy may be specified as a percentage, such as 97%, and so on.

The computing device sets a threshold, which is referred to as a target difference threshold, from the received specified classification accuracy (106). In one implementation, the target difference threshold is set to one minus the k-th root of the classification accuracy, where k is the length of each data item. That is, for a specified classification accuracy a, the target difference threshold d can be set to $$1 - \sqrt[k]{a}.$$

The target difference threshold can also be specified as a percentage, such as 0.1%.

The target difference threshold is used as a basis upon which to decide whether two data items are sufficiently similar to one another. If the difference between two data items is on a percentage basis less than the target difference threshold, then the data items are said to be sufficiently similar to one another. If the difference is not less than the target difference threshold, then the data items are said to not be sufficiently similar to one another. The difference between two data items may be expressed as one minus the similarity measure between the two data items, in one implementation. The difference between two data items can be determined as the distance, such as the pairwise distance, between the two data items.

The computing device determines the difference, such as the distance, between the data items of each unique data item pair within the complete set of data items (108). The difference may be determined as the pair-wise distance. The complete set of data items may be specified as $\{G\}=g_1, g_2, \ldots g_n$. For each unique pair of $i=1 \ldots n$, $j=1 \ldots n$, where $i \neq j$, the distance $\delta(g_i, g_j)$ is determined. As such, for each data item within the complete data set, the distance between the data item and every other data item within the complete data set is determined.

The computing device then repeats the following until the complete set of data items becomes empty (110). For each data item in the complete set, the computing device determines a similarity subset of the complete set (112). The similarity subset for a given data item includes the other data items that the distance to which from the given data item is less than the target difference threshold. That is, the similarity subset $\{N_i\}$ for data item $g_i$ includes each data item $g_j$, where $i \neq j$, for which the distance $\delta(g_i, g_j) < d$. The number $N(i)$ of such data items within the similarity subset $$\{N_i\} \text{ is } \sum_{i \neq j} \begin{array}{l} 1 \text{ if } \delta(g_i, g_j) < d \\ 0 \text{ otherwise} \end{array}.$$

For the similarity subset $\{N_i\}$ having including the most data items, which is the similarity subset $\{N_i\}$ having the largest $N(i)$ (i.e., max $[N(i)]$), the computing device selects a data item $g_k \in \{N_i\}$ and moves the selected data item from the complete set to a reference database (116). That is, the selected data item is removed from the complete set $\{G\}$, and added to the reference database. The computing device may select the data item $g_k$ from the similarity subset $\{N_i\}$ having including the most data items in a number of different ways. As one example, the computing device may just randomly select a data item from this similarity subset. As a second example, the computing device may select the data item $g_k$ that has the shortest distance $\delta(g_k, g_j)$ to every other data item $g_j$ within the similarity subset in question.

The computing device then removes from the complete set of data items $\{G\}$ every data item $g_j$ to which the distance $\delta(g_k, g_j)$ from the selected data item $g_k$ is less than the target difference threshold d (116). The removed data items can include some of the data items within the similarity subset from which the data item $g_k$ was selected, as well as some of the data items within the complete set but that are not within this similarity subset. The computing device then repeats the method 100 at part 112 if any data items remain within the complete set {G}.

The result of the method 100 is the construction or a reference database that is a subset of the complete set of data items, and which optimally represents the complete set of data items for new data item classification purposes. As noted above, using the reference database constructed pursuant to the method 100 to classify a new data item instead of using the complete set has an accuracy at the specified classification accuracy. The classification accuracy itself dictates that the target difference threshold on which basis the reference database is effectively constructed. The length of each data item also affects the target difference threshold since the classification accuracy a, the target difference threshold d, and the data item length k are related to one another by $a = (1-d)^k$.

Using the reference database in lieu of the complete set of data items for classifying new data items has a number of advantages. First, because the reference database does not include all the data items of the complete set, the reference database requires less storage space, which means that the techniques described herein alleviate data storage pressure on the memory resources of the computing system performing the classification. Second, computational pressure on the processing resources of the computing system perform the classification is also reduced, since a new data item has to be compared to fewer data items when the reference database is utilized as opposed to the complete set of data items.

Figure 2:
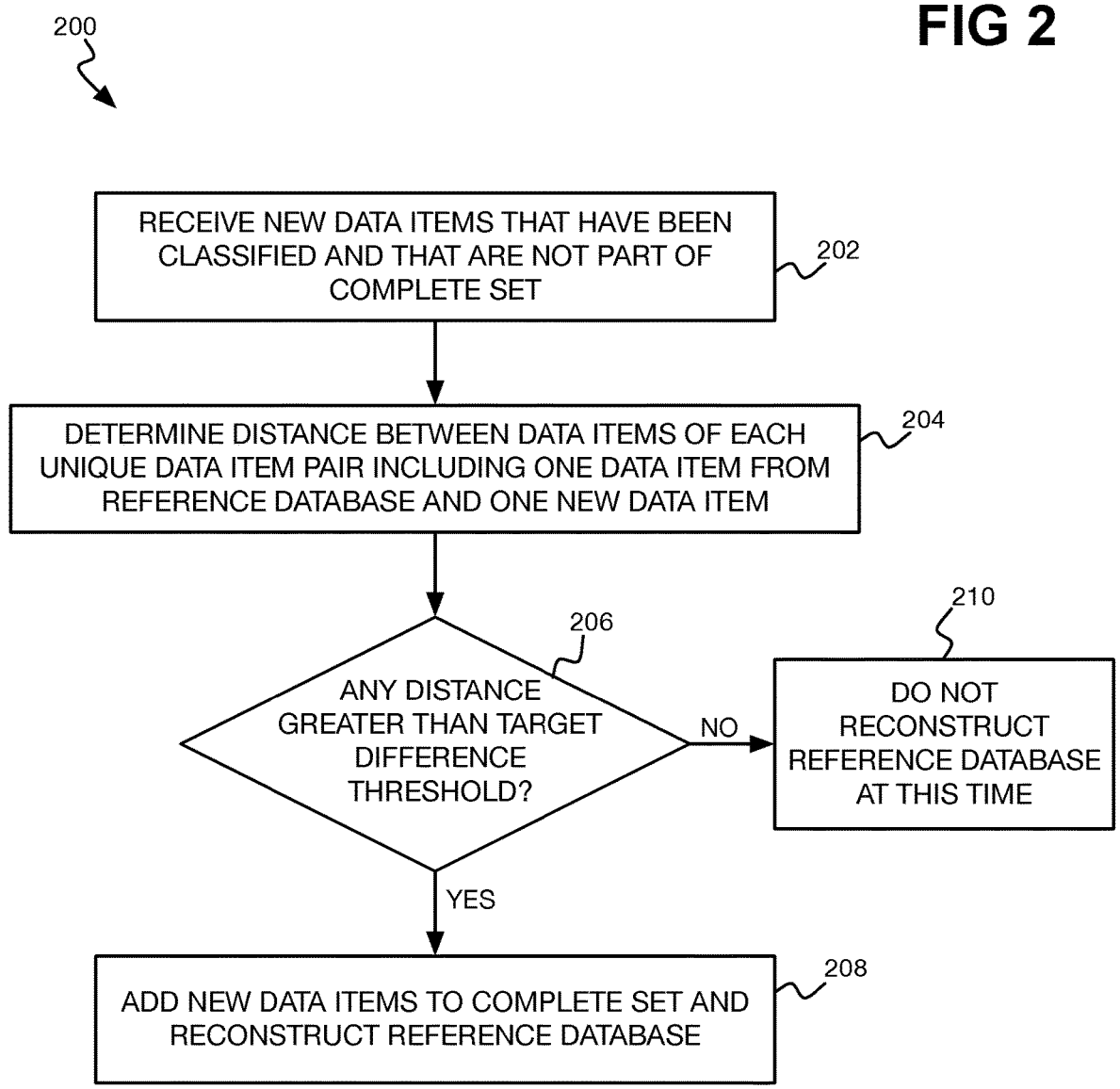
FIG. 2 is a flowchart of an example method to determine whether the reference database is to be reconstructed, such as via the method of FIG. 1, when new data items have been generated.

FIG. 2 shows an example method to determine whether the reference database should be reconstructed, when data items have been generated. Like the method 100, the method 200 can be implemented as program code stored on a non-transitory computer-readable data storage medium. A processor of a computing device can execute the program code to perform the method 200. The method 200 can assume that the reference database has already been constructed from a complete set of data items $\{G\}=g_1, g_2, \ldots g_n$, such as via the method 100.

The computing device receives a set of one or more new data items (202). The set of new data items may be specified as $\{H\}=h_1, h_2, \ldots h_m$. The set of new data items may be larger or smaller than the complete set of data items {G}, but in general is smaller. Each new data item has an associated length, which is the same length as each data item in the complete set.

The computing device determines the difference, such as the distance, between the data items of each unique pair that includes one data item from the reference database that has been constructed, and one new data item from the set of new data items {H} (204). If the reference database is specified as the set $\{R\}=r_1, r_2, \ldots, r_p$, then for each unique pair of $i=1 \ldots m$, $j=1 \ldots p$, the distance $\delta(h_i, r_j)$ is determined. As such, for each new data item, the distance between the new data item and every data item within the reference database is determined.

If no distance that has been determined is greater than the target difference threshold on which basis the reference database was previously constructed (206), then the reference database does not have to be reconstructed (210). This is because every new data item is within a target difference threshold of every data item within the reference database.

As such, every new data item is sufficiently similar to every data item within the reference database, and therefore the reference database already adequately covers the new data items.

However, if any distance that has been determined is greater than the target difference threshold on which basis the reference database was previously constructed (208), then the new data items are added to the complete set of data items and the reference database is reconstructed. The complete set of data items in this case is the complete set of data items received in part 102 of the method 100, prior to data items being removed therefrom in part 110. The updated complete set of data items can be specified as $\{G^*\}=\{G\}\cup\{H\}$. The reference database can be reset to include no data items, and the method 100 can be performed starting at part 108 in relation to the updated complete set of data items {G*} to reconstruct the reference database.

Figure 3:
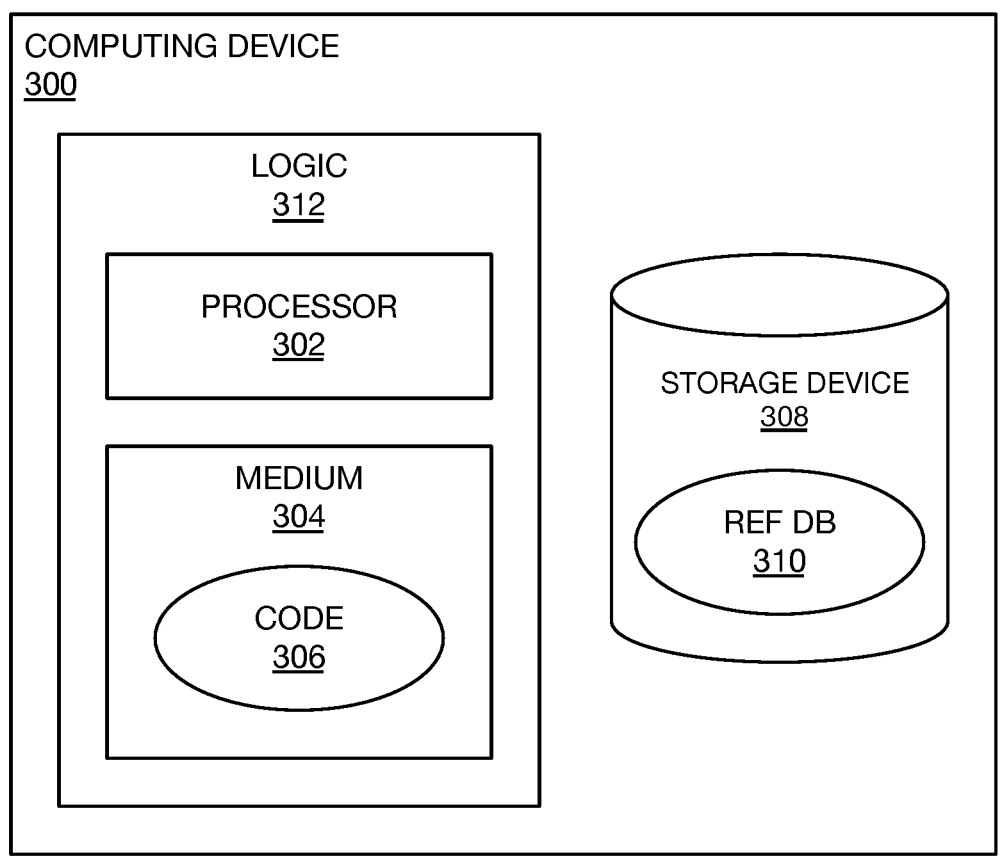
FIG. 3 is a diagram of an example computing device that can perform the methods of FIGS. 1 and 2.

FIG. 3 shows an example computing device 300. The computing device 300 may be a computer, such as a desktop computer or a server. The computing device 300 can include a processor 302 and a computer-readable data storage medium 304 storing program code 306. The processor 302 can execute the code 306 from the medium 304 to perform the methods 100 and 200 that have been described. The processor 302 and the computer-readable data storage medium 304 can be said to constitute an example of hardware logic 312 that performs the functionality of the methods 100 and 200. In other implementations, the hardware logic 312 may be implemented as an application-specific integrated circuit (ASIC), a field-programmable gate array (FPGA), and so on.

The hardware logic 312 may additionally or alternatively use an already constructed reference database. For instance, the computing device 300 may include a storage device 308 on which an already constructed reference database 310 is stored. The hardware logic 310 thus can classify a new data item using the reference database 310. Classification in this respect can include determining whether the new data item is sufficiently similar to any data item within the reference database 310. Sufficient similarity in this respect can include whether the distance between the new data item and a data item within the reference database 310 is less than the target difference threshold.

The computing device 300 thus can classify a new data item using just the reference database 310 and not the complete data set of data items from which the reference database 310 was constructed. Classification of a new data item in this respect is correct with a probability equal to the classification accuracy to which the target difference threshold is related, as has been described. Classification also occurs more quickly than using the complete data set, and requires less storage space on the storage device 308 than the complete set.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim:

1. A method comprising:
   storing, by a computing device on a storage device, a reference database that is a subset of a complete set of data items, the reference database requires less storage space than the complete set of data items, each data item of the complete set having a distance to a data item of the subset that is less than a target difference threshold, the reference database having a classification accuracy equal to the k-th power of one minus the target difference threshold, and wherein k is an associated length of each data item; and
   classifying, by the computing device using logic implemented at least in hardware, a new data item using the reference database.

2. The method of claim 1, wherein each data item is a genome having a plurality of substrings that are each of length k.

3. The method of claim 2, wherein each the plurality of substrings is a kmer.

4. The method of claim 1, wherein the classification accuracy is a probability that a new data item is classified correctly using just the data items moved to the reference database and not all the data items of the complete set.

5. The method of claim 1, wherein classifying the new data item using just the reference database and not the complete set occurs more quickly than using the complete set.

6. The method of claim 1, wherein the target difference threshold is represented as a percentage.

7. The method of claim 1, wherein each data item is a protein having one or more sub strings that are each of length k.

8. A computer system comprising:
one or more computer processors, one or more computer-readable storage media, and program instructions stored on the one or more computer-readable storage media for execution by at least one of the one or more computer processors, the program instructions comprising:
program instructions to store, by a computing device on a storage device, a reference database that is a subset of a complete set of data items, the reference database requires less storage space than the complete set of data items, each data item of the complete set having a distance to a data item of the subset that is less than a target difference threshold, wherein the reference database has a classification accuracy equal to the k-th power of one minus the target difference threshold, and wherein k is an associated length of each data item; and
program instructions to classify, by the computing device using logic implemented at least in hardware, a new data item using the reference database.

9. The computer system of claim 8, wherein each data item is a genome having a plurality of sub strings that are each of length k.

10. The computer system of claim 9, wherein each of the plurality of substrings is a kmer.

11. The computer system of claim 8, wherein the classification accuracy is a probability that a new data item is classified correctly using just the data items moved to the reference database and not all the data items of the complete set.

12. The computer system of claim 8, wherein classifying the new data item using just the reference database and not the complete set occurs more quickly than using the complete set.

13. The computer system of claim 8, wherein the target difference threshold is represented as a percentage.

14. The computer system of claim 8, wherein each data item is a protein having one or more substrings that are each of length k.

15. A computer program product comprising:
one or more computer-readable storage media and program instructions stored on the one or more computer-readable storage media, the program instructions comprising:
program instructions to store, by a computing device on a storage device, a reference database that is a subset of a complete set of data items, the reference database requires less storage space than the complete set of data items, each data item of the complete set having a distance to a data item of the subset that is less than a target difference threshold, wherein the reference database has a classification accuracy equal to the k-th power of one minus the target difference threshold, and wherein k is an associated length of each data item; and
program instructions to classify, by the computing device using logic implemented at least in hardware, a new data item using the reference database.

16. The computer system of claim 15, wherein each data item is a genome having a plurality of substrings that are each of length k.

17. The computer system of claim 16, wherein each the plurality of substrings is a kmer.

18. The computer system of claim 15, wherein the classification accuracy is a probability that a new data item is classified correctly using just the data items moved to the reference database and not all the data items of the complete set.

19. The computer system of claim 15, wherein classifying the new data item using just the reference database and not the complete set occurs more quickly than using the complete set.

20. The computer system of claim 15, wherein the target difference threshold is represented as a percentage.

21. The computer system of claim 15, wherein each data item is a protein having one or more sub strings that are each of length k.

* * * * *